United States Patent
Nanduri (10) Patent No.: US 9,798,585 B2
(45) Date of Patent: Oct. 24, 2017

(54) CONTEXT SWITCHING WITH READER-WRITER LOCKS

(71) Applicant: Oracle International Corporation, Redwood Shores, CA (US)

(72) Inventor: Keshav Sai Nanduri, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 233 days.

(21) Appl. No.: 14/716,833

(22) Filed: May 19, 2015

(65) Prior Publication Data

US 2016/0342444 A1 Nov. 24, 2016

(51) Int. Cl.
G06F 9/46 (2006.01)
G06F 9/50 (2006.01)
G06F 9/48 (2006.01)

(52) U.S. Cl.
CPC .......... *G06F 9/5038* (2013.01); *G06F 9/4881* (2013.01)

(58) Field of Classification Search
CPC .................................................. G06F 9/4881
USPC ........................................................ 718/102
See application file for complete search history.

(56) References Cited

U.S. PATENT DOCUMENTS

| 7,210,146 | B2 | 4/2007 | Hsieh | |
|---|---|---|---|---|
| 7,565,651 | B1* | 7/2009 | Carey | G06F 9/4881 |
| | | | | 718/100 |
| 7,603,502 | B2 | 10/2009 | Richter et al. | |
| 8,161,481 | B2 | 4/2012 | May | |
| 8,510,738 | B2 | 8/2013 | Rogers et al. | |
| 8,584,138 | B2 | 11/2013 | Sangili et al. | |
| 8,589,943 | B2 | 11/2013 | Bates | |
| 9,069,566 | B1* | 6/2015 | Kumar | G06F 9/3855 |
| 2003/0061394 | A1* | 3/2003 | Buch | G06F 9/526 |
| | | | | 719/310 |
| 2007/0067774 | A1* | 3/2007 | Kukanov | G06F 9/526 |
| | | | | 718/102 |
| 2010/0241774 | A1* | 9/2010 | Olszewski | G06F 9/52 |
| | | | | 710/200 |
| 2010/0242043 | A1* | 9/2010 | Shorb | G06F 9/526 |
| | | | | 718/104 |
| 2015/0286586 | A1* | 10/2015 | Yadav | G06F 9/528 |
| | | | | 711/152 |

OTHER PUBLICATIONS

Turnstiles and priority inheritance, Sunworld, Aug. 1999 (10 pages).

(Continued)

*Primary Examiner* — Qing Chen
*Assistant Examiner* — Clint Thatcher
(74) *Attorney, Agent, or Firm* — Osha Liang LLP (57) ABSTRACT

A method for scheduling threads for a software application. The method may include obtaining a thread from a thread queue. The thread may be a program segment of a software process. The method may include determining that the thread is for reading data from a program resource. The method may include, in response to determining that the thread is for reading the program resource, designating an exclusion lock on the program resource to various reader threads. The reader threads may include the thread from the thread queue. The method may include retrieving, by the reader threads, data from the program resource.

11 Claims, 8 Drawing Sheets

(56) References Cited

OTHER PUBLICATIONS

Carbone, John, "Reducing Context Switching with Preemption-Threshold", Express Logic, Inc., Jan. 2011 (41 pages).
Java Concurrency in Practice, Part III, Section 11.4, pp. 22-32, May 19, 2006 (12 pages).

* cited by examiner

FIG. 6

# CONTEXT SWITCHING WITH READER-WRITER LOCKS

BACKGROUND

In a multiprocessor environment, a protocol may organize access to various computer resources through various locking mechanisms. For example, a computer resource may be in a locked state, while a thread is holding or owning a lock to the computer resource at a particular time. As such, the thread that owns the lock may enter a section of code protected by the lock. If a different thread attempts to obtain a lock on a computer resource already being held by the current thread, the different thread may not access data in the computer resource until the lock is released by the current thread.

SUMMARY

In general, in one aspect, the invention relates to a method for scheduling threads for a software application. The method includes obtaining a thread from a thread queue. The thread is a program segment of a software process. The method further includes determining that the thread is for reading data from a program resource. The method further includes, in response to determining that the thread is for reading the program resource, designating an exclusion lock on the program resource to various reader threads. The reader threads include the thread from the thread queue. The method further includes retrieving, by the reader threads, data from the program resource.

In general, in one aspect, the invention relates to a system for scheduling threads for a software application. The system includes a processor and a memory executable by the processor. The memory includes functionality for obtaining a thread from a thread queue, wherein the thread is a program segment of a software process. The memory further includes functionality for determining that the thread from the thread queue is for reading data from a program resource. The memory further includes functionality for, in response to determining that the thread is for reading the program resource, designating an exclusion lock on the program resource to various reader threads.

In general, in one aspect, the invention relates to a non-transitory computer readable medium (CRM) storing instructions for scheduling threads for a software application. The instructions include functionality for obtaining a thread from a thread queue. The thread is a program segment of a software process. The instructions further include functionality for determining that the thread from the thread queue is for reading data from a program resource. The instructions further include functionality for, in response to determining that the thread is for reading the program resource, designating an exclusion lock on the program resource to various reader threads. The reader threads include the thread from the thread queue. The instructions further include functionality for retrieving, by the reader threads, data from the program resource.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments include a method, a system, and a non-transitory computer readable medium for scheduling threads for a software application. In particular, one or more embodiments are directed to a method for designating an exclusion lock for a program resource. For example, various reader threads in a thread queue may obtain the exclusion lock substantially simultaneously, and subsequently retrieve data from the program resource. Furthermore, a writer thread from a writer queue may obtain the exclusion lock for the program resource automatically after the reader threads have finished using the program resource. As such, a writer thread may obtain the exclusion lock without any additional context switches being performed on other threads in the thread queue.

Figure 1:
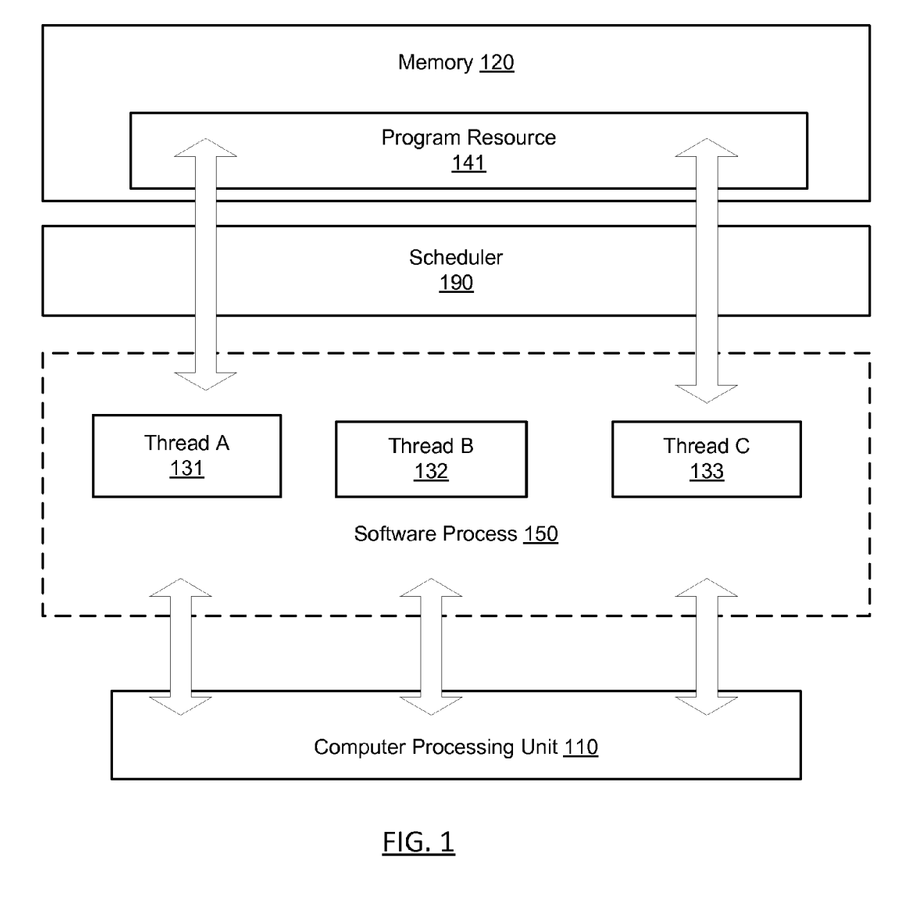
FIGS. 1 and 2 show systems in accordance with one or more embodiments.

FIG. 1 shows a schematic of a system for managing a software process in accordance with one or more embodiments. In one or more embodiments, the system as shown in FIG. 1 includes a computer processing unit (110), memory (120) having a program resource (141), a software process (150) having various threads (e.g., thread A (131), thread B (132), thread C (133)), and a scheduler (190). The software process (150) may include a series of computer instructions performed by the computer processing unit (110) as part of a software application.

In one or more embodiments, the threads (131, 132, 133) are individual program segments of the software process (150). For example, threads (131, 132, 133) may be kernel threads or user threads, and may include various software instructions executable by the computer processing unit (110). As such, a particular thread may be assigned to perform a particular task for the software process (150). Thus, the computer processing unit (110) may switch back and forth between various threads depending on which tasks need to be performed for the software process (150).

In one or more embodiments, the program resource (141) may include information stored in a data structure accessible to threads (131, 132, 133) during the operation of the software process (150). For example, the program resource (141) may be data for a particular program variable used by the threads (131, 132, 133). As such, the program resource (141) may be shared between threads (131, 132, 133), but not with threads (not shown) outside the software process (150). While the program resource (141) is shown in FIG. 1 as being located in a portion of memory, program resources may also include other resource types, such as file handles, sockets, device handles, and windows.

The scheduler (190) may be a software application managed by an operating system on a computing device (not shown). Specifically, the scheduler (190) may be configured with a scheduling algorithm for giving threads, processes, and data flows access to various resources on the computing device. For example, the scheduler (190) may organize the timeline when threads (131, 132, 133) execute and/or obtain access to various program resources (e.g., program resource (141)). Specifically, if a particular thread is waiting behind other threads for the program resource (141), the scheduler (190) may suspend the particular thread (i.e., put the thread to sleep) until the program resource (141) becomes available. Furthermore, after the program resource (141) becomes available, the scheduler (190) may activate a suspended thread (i.e., waking up the sleeping thread), which may then use the program resource (141).

Figure 2:
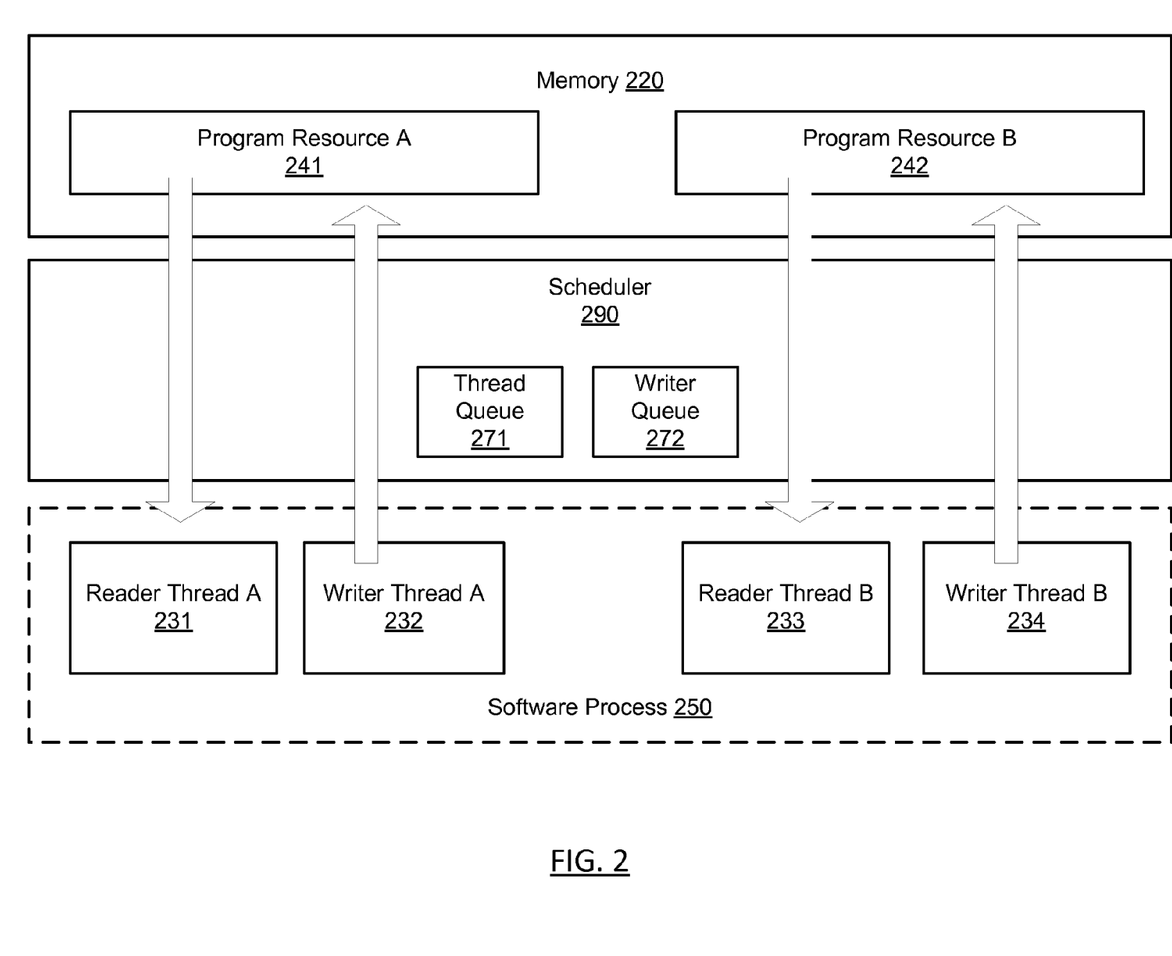

Turning to FIG. 2, FIG. 2 shows a schematic of a system for managing a software process in accordance with one or more embodiments. In one or more embodiments, the system as shown in FIG. 2 includes memory (220) having various program resources (e.g., program resource A (241), program resource B (242)), a software process (250) having various reader threads (e.g., reader thread A (231), reader thread B (233)) and various writer threads (e.g., writer thread A (232), writer thread B (234)), and a scheduler (290). The reader threads (231, 233) may retrieve information stored from the program resources (241, 242), while the writer threads (232, 234) may update information in the program resources (241, 242).

In one or more embodiments, the scheduler (290) may designate various exclusion locks (also called a "mutex") on the program resources (241, 242). Specifically, an exclusion lock may prevent other threads in the software process (250) from using a program resource out of turn. Thus, the exclusion lock may provide exclusive access to one or more threads until the exclusion lock has been relinquished to another thread. For example, if a reader thread has the exclusion lock, no writer threads may change data values in the program resource while the reader thread is retrieving data. Conversely, if a writer thread has the exclusion lock, no reader threads may retrieve information from the program resource until the writer thread has finished changing various data values in the program resource. In one or more embodiments, various reader threads hold the exclusion lock for a single program resource substantially simultaneously.

In one or more embodiments, the scheduler (290) includes a thread queue (271) and a writer queue (272). For example, the thread queue (271) may be a list of suspended threads (also called sleeping threads) waiting to obtain access to a specific program resource. In one or more embodiments, an exclusion lock is a reader-writer lock that includes existing reader threads accessing a program resource and a writer thread waiting in a writer queue. As such, the writer thread be designated a mutex while waiting for the reader threads to complete their tasks using the program resource.

In one or more embodiments, the writer queue (272) includes a writer thread designated as being the next to update a program resource. For example, after various reader threads are finished using the program resource, the writer thread in the writer queue (272) may automatically activate and obtain an exclusion lock on the program resource. In one or more embodiments, the writer queue (272) includes multiple writer threads.

Figure 3:
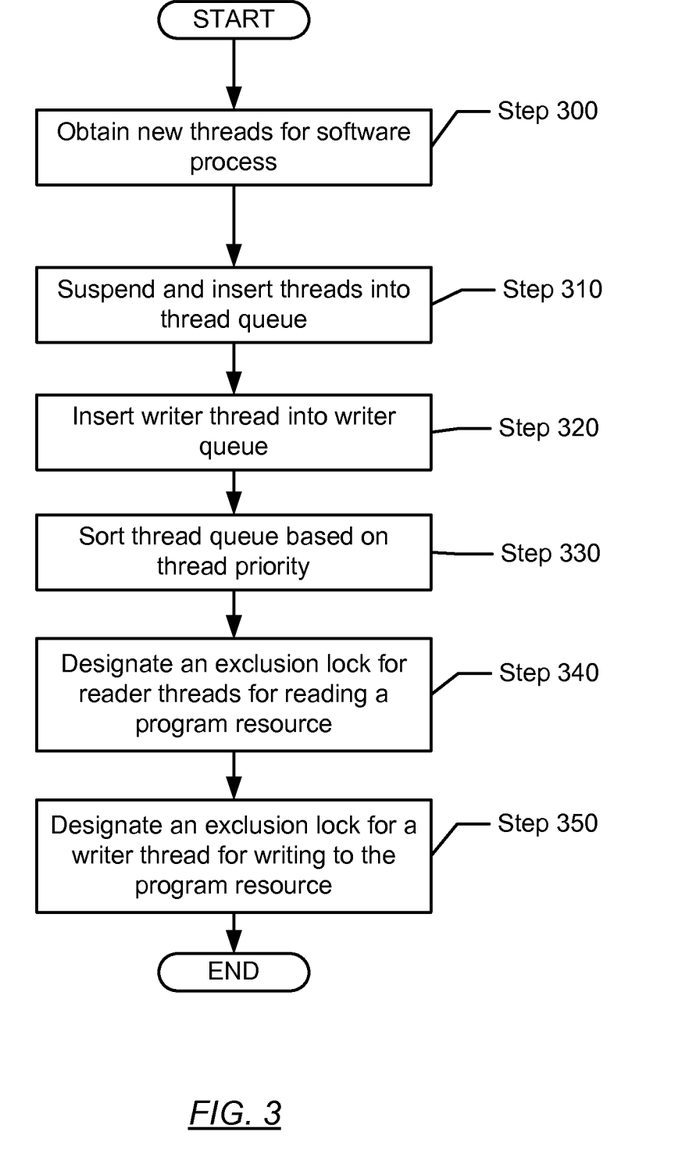
FIGS. 3 and 4 show flowcharts in accordance with one or more embodiments.

FIG. 3 shows a flowchart for scheduling threads for a software application in accordance with one or more embodiments. Specifically, the process depicted in FIG. 3 may be performed by the scheduler described in FIGS. 1 and 2. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, various new threads are obtained for a software process in accordance with one or more embodiments. Specifically, a software process may be organized into different tasks performed by different threads. After a previous thread completes a task, it may be terminated and replaced with a new thread dedicated to performing a different task for the software process. Threads may be implemented by an operating system, for example, using various system calls that define a specific number of concurrently operating threads for the software process.

In Step 310, various threads are suspended and inserted into a thread queue in accordance with one or more embodiments. In particular, various threads in a software process may attempt to access a program resource already associated with an exclusion lock. However, unable to obtain their own exclusion lock on the program resource, a scheduler may suspend the threads and place the threads into a thread queue. As such, threads may wait in the thread queue until the program resource becomes available again.

In one or more embodiments, a scheduler may insert a new thread into a thread queue based on a priority score of the new thread. For example, if the new thread's priority score is the lowest priority score for any thread in the thread queue, the new thread may be placed at the bottom of the thread queue. For more information on thread priority, see Step 330 below.

In Step 320, a writer thread is inserted into a writer queue in accordance with one or more embodiments. Specifically, a writer thread may be moved from the thread queue and placed into a separate queue, e.g., the writer queue as described in FIG. 2. In one or more embodiments, when various threads in a thread queue are activated for retrieving data from a program resource, the next writer thread in the thread queue is activated and moved to the writer queue.

In Step 330, the thread queue is sorted based on thread priority in accordance with one or more embodiments. For example, threads in the thread queue may be organized at various locations according to a predefined order. Thus, the predefined order may determine when threads are scheduled to access a program resource. In one or more embodiments, for example, threads in the thread queue are sorted based on thread priority. Specifically, each thread in the thread queue may receive a priority score. As such, the thread with the highest priority score may be at the top of the thread queue (i.e., being designated next to obtain an exclusion lock on a program resource), while the thread with the lowest priority score may be last to obtain an exclusion lock. Priority scores may be determined using a priority algorithm that includes various thread characteristics such as the time the thread has spent in the thread queue, when the thread must perform a task, whether the thread must perform a task before other threads in the thread queue, etc.

In one or more embodiments, the priority score for various threads in the thread queue are updated periodically. For example, the priority score of each thread may be updated whenever one or more threads have finished using a program resource. The priority scores for various threads may also be updated when one or more threads are removed from the thread queue. In one or more embodiments, a new thread is inserted into a location in a thread queue based on the priority score of the new thread.

In one or more embodiments, priority scores are increased based on the time a thread has spent in the thread queue. As such, if a thread has a low priority score (i.e., is located proximate the bottom of the thread queue), the thread may not remain at the bottom of the queue indefinitely while other threads are regularly inserted higher in the thread queue. In other words, an individual thread's priority score may increase based on the amount of time the individual thread sleeps in the thread queue. In one or more embodiments, while the thread queue is sorted, the order of threads in the writer queue remains unchanged.

In one or more embodiments, the thread queue is organized in such a manner that reader threads are grouped together in a thread queue. For example, different groups of reader threads may be separated in the thread queue by one or more writer threads.

In Step 340, an exclusion lock is designated for various reader threads in accordance with one or more embodiments. Specifically, a scheduler may activate several threads from a thread queue seeking read access to the program resource. For example, if the next few threads in a thread queue are reader threads, a scheduler may designate a group exclusion lock allowing the reader threads to retrieve data from the program resource concurrently.

In Step 350, an exclusion lock is designated for a writer thread in accordance with one or more embodiments. In one or more embodiments, for example, after a group of reader threads have finished using the program resource, a writer thread may be given the exclusion lock for the program resource. A scheduler may activate the writing thread seeking write access to the program resource.

Figure 4:
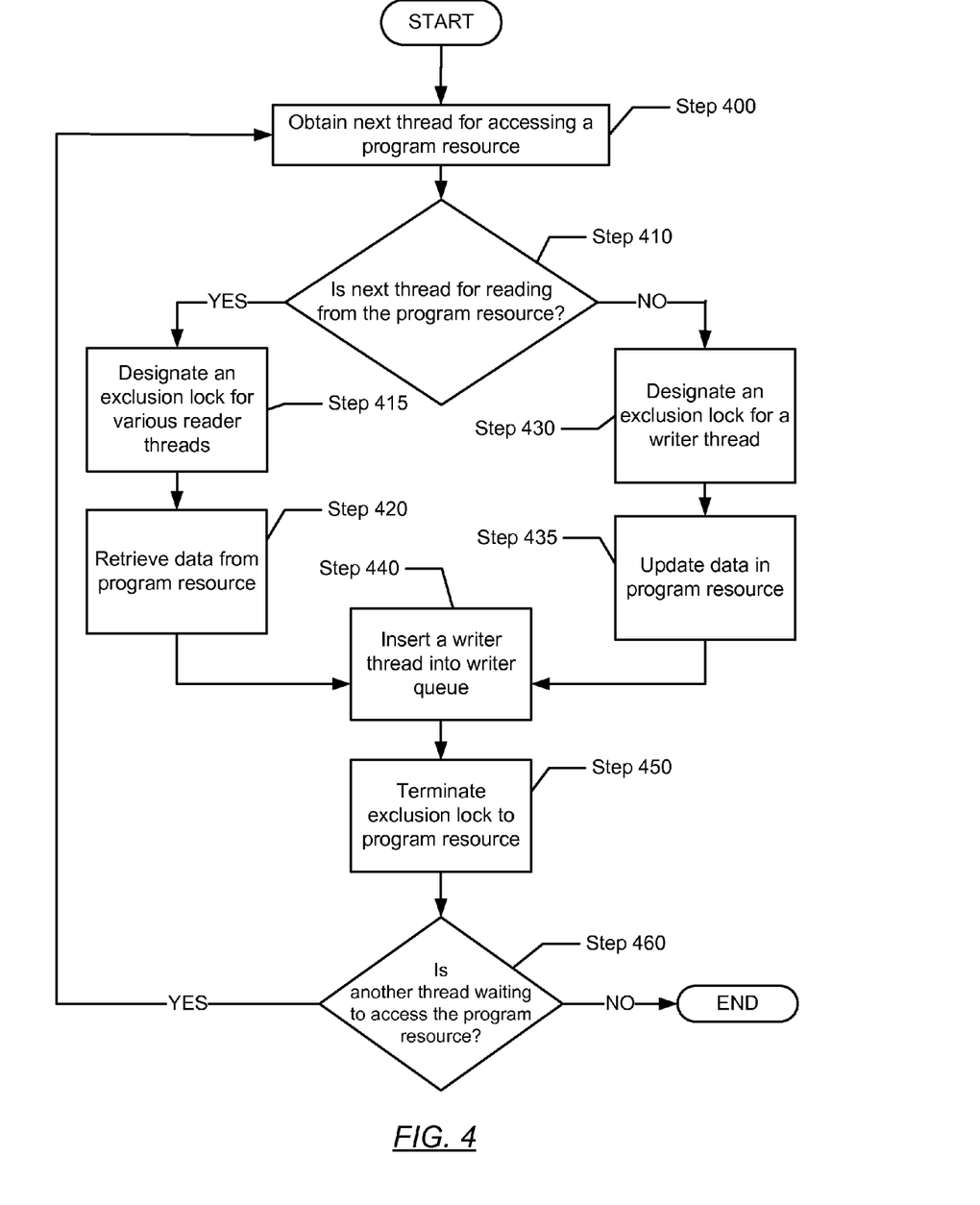

FIG. 4 shows a flowchart for scheduling threads for a software application in accordance with one or more embodiments. In one or more embodiments, for example, one or more steps in FIG. 4 may be performed by a scheduler as described in FIGS. 1-2. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, the next thread is obtained for accessing a program resource in accordance with one or more embodiments. In one or more embodiments, for example, a scheduler may activate the next thread in a thread queue or obtain a writer thread from a writer queue.

In one or more embodiments, for example, when a writer thread relinquishes an exclusion lock on a program resource, threads in a thread queue are activated one after another until a writer thread is found. As such, context switches may occur only for threads in the thread queue located before the next writer thread. Threads located after the next writer thread may experience no context switches and may remain suspended. This reduction in context switches may save on processing power and time.

In Step 410, a determination is made whether the next thread is for reading a program resource in accordance with one or more embodiments. For example, if the next thread is a reader thread, the next thread may not be altering data within the program resource. As such, more than one reader thread may use the program resource simultaneously. If the next thread is for reading, the process may proceed to Step 415. Otherwise, the process may proceed to Step 430. In one or more embodiments, the determination may include whether the next thread is for writing to a program source. As such, the process may proceed accordingly.

In one or more embodiments, if the previous exclusion lock on the program resource was for one or more reader threads, a scheduler alternates to a writer thread as having access to the program resource. As such, the determination in Step 410 may be made indirectly. In one or more embodiments, if the previous thread was a writer thread from a writer queue, the scheduler subsequently designates an exclusion lock to various reader threads in the thread queue.

In Step 415, an exclusion lock is designated for various reader threads in accordance with one or more embodiments. Specifically, in one or more embodiments, the next thread obtained in Step 400 is included among the reader threads. In one or more embodiments, a thread queue may be searched for consecutive reader threads for inclusion in the exclusion lock. After the reader threads are selected, a scheduler may perform a context switch on each one, thereby activating them to use a particular program resource. As such, rather than providing read access to data in the program source to only one reader thread, multiple reader threads may perform their tasks simultaneously.

In Step 420, data is retrieved from the program resource in accordance with one or more embodiments. Specifically, the reader threads included in the exclusion lock in Step 415 may access data within the program source. Thus, the retrieved data may be used by a software process associated with the various reader threads.

In Step 430, an exclusion lock is designated for a writer thread in accordance with one or more embodiments. In one or more embodiments, for example, after various reader threads have finished using the program resource, the scheduler automatically activates a writer thread from the writer queue. As such, the activated writer thread may obtain the exclusion lock on the program resource. Thus, in one or more embodiments, the scheduler performs a context switch on the writer thread inside the writer queue without searching the thread queue and/or performing any additional context switches, e.g., with respect to threads in the thread queue.

In Step 435, data in the program resource is updated in accordance with one or more embodiments. As such, the writer thread in Step 430 may input or change data in the program resource as part of a task for a software process.

In Step 440, a writer thread is inserted into a writer queue in accordance with one or more embodiments. Specifically, after searching a thread queue for reader threads in Step 415, the scheduler may determine the location of the next writer thread in the thread queue. In conjunction with designating an exclusion lock to the reader threads, the scheduler may move the next writer thread in the thread queue over to the writer queue.

In one or more embodiments, after a writer thread is designated write access in Step 440, the scheduler replaces the writer thread with write access with a new writer thread from the thread queue. For example, the new writer thread may be the writer thread with the highest priority in the thread queue. The writer queue may also have multiple writer threads waiting to access the program source. As such, a scheduler, for example, may wait to obtain a writer thread for the writer queue until there are no more writer threads in the writer queue.

In one or more embodiments, a new writer thread is automatically inserted into a writer queue if an exclusion lock already exists for a program resource. For example, when a new writer thread is generated by an operating system, which attempts to access a program resource having a preexisting exclusion lock, a scheduler may directly insert the new writer thread into the writer queue. As such, one or more writer threads may not spend any time in the thread queue.

In Step 450, an exclusion lock is terminated for a program resource in accordance with one or more embodiments. As such, when reader threads or writer threads have completed their respective tasks using a program resource, the scheduler may determine that the program resource is now available for other threads to obtain an exclusion lock on the program resource.

In Step 460, a determination is made whether another thread is waiting to access the program resource in accordance with one or more embodiments. For example, a determination may be made whether a thread queue and/or the writer queue are empty. If a thread is still waiting in either the thread queue or the writer queue, the process proceeds to Step 400 to obtain another thread waiting to access the program resource. If both the thread queue and the writer queue are empty, the process ends.

In one or more embodiments, the thread queue and/or the writer queue are sorted before another thread is obtained for accessing the program resource. In one or more embodiments, for example, the thread queue is resorted according to thread priority. Priority scores for suspended threads in the thread queue may also be updated after Step 460.

Figure 5A:
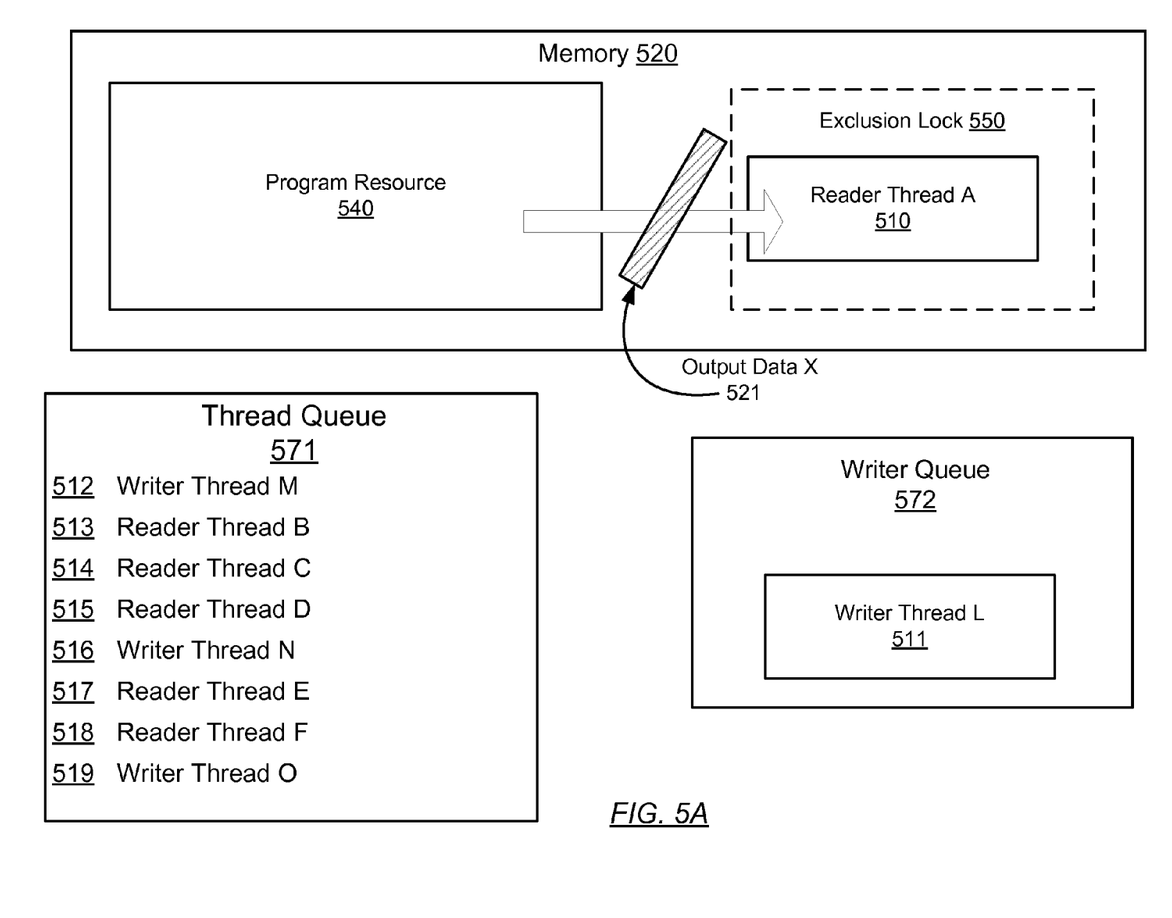
FIGS. 5A-5C show examples in accordance with one or more embodiments.
Figure 5B:
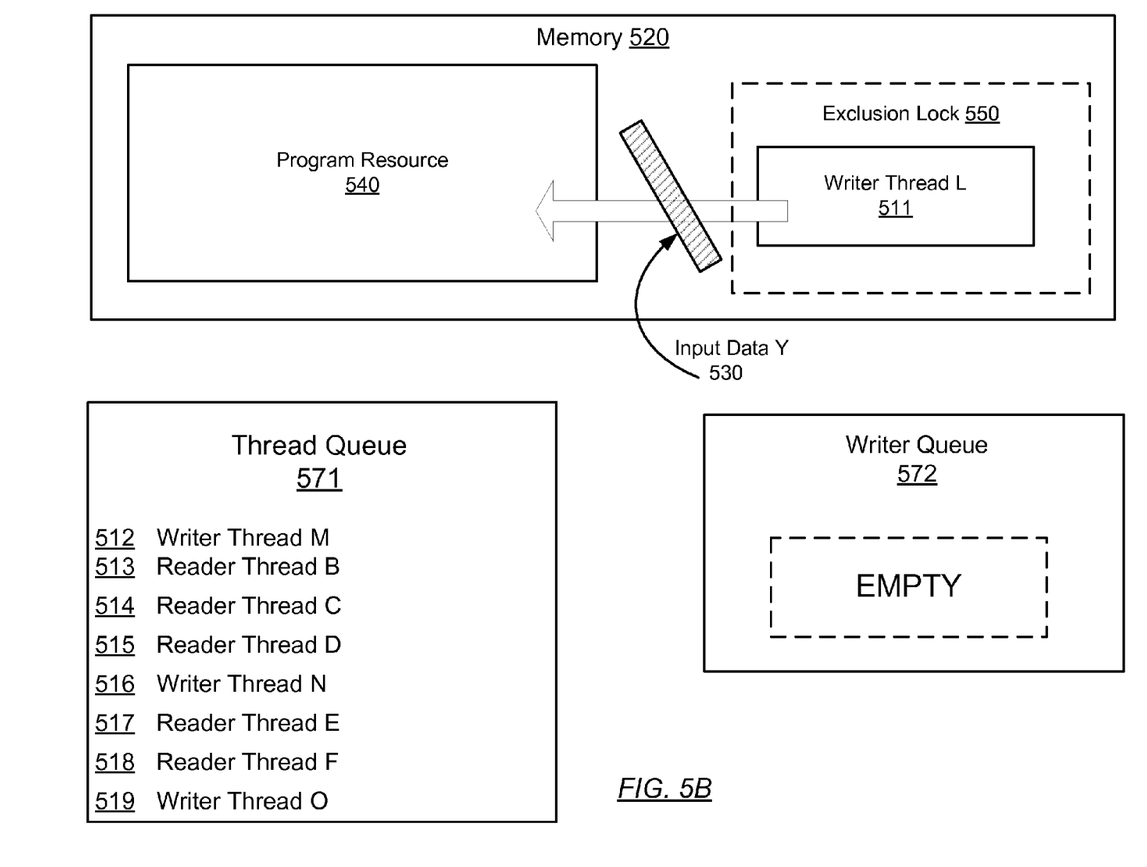
Figure 5C:
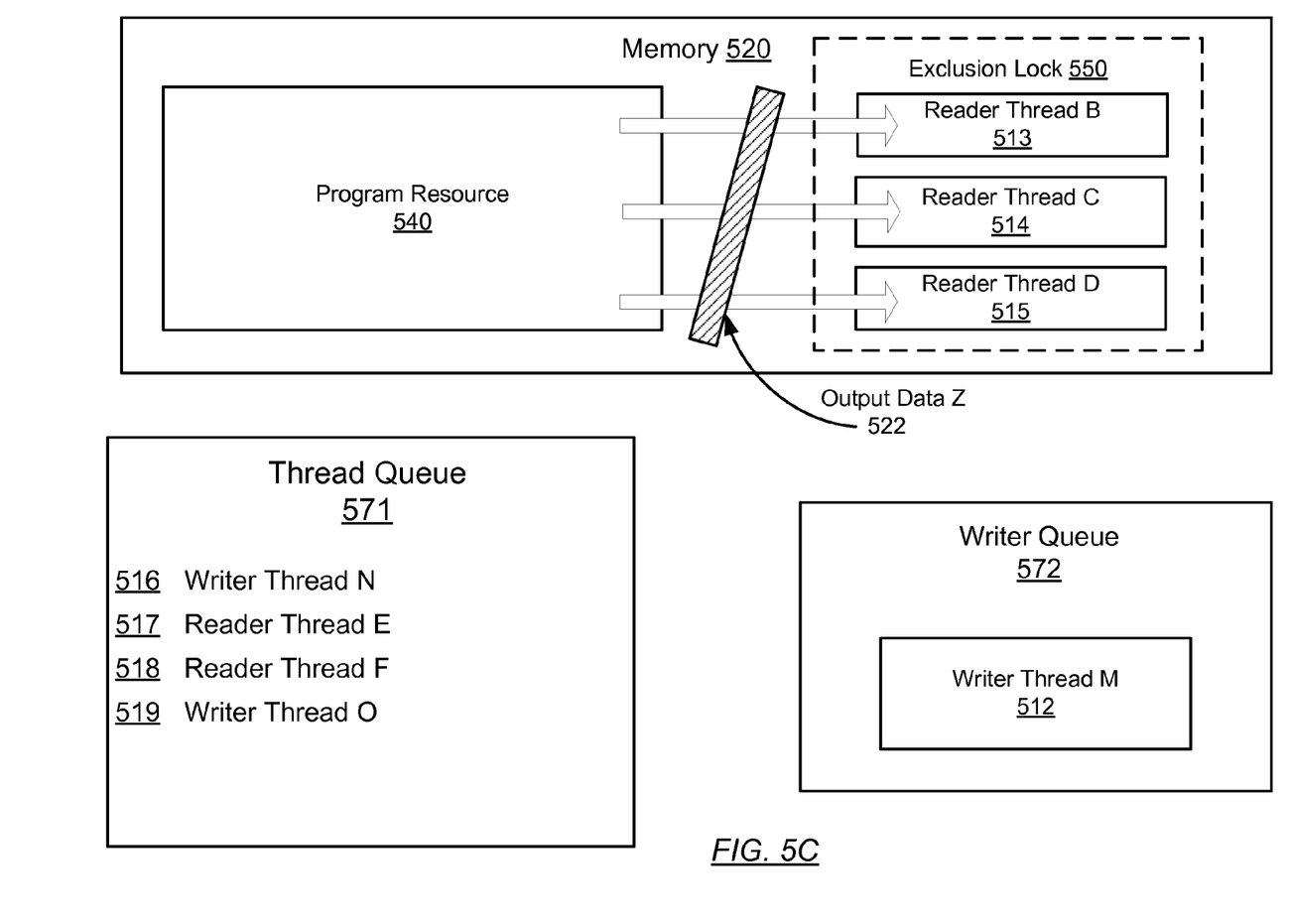

FIGS. 5A-5C provide examples of scheduling threads for a software application. The following examples are for explanatory purposes only and are not intended to limit the scope of the invention.

In FIG. 5A, a system is shown having a thread queue (571), a writer queue (572), a memory (520) containing a program resource (540), and an exclusion lock (550) for the program resource (540). The thread queue (571) may include various reader threads (e.g., reader thread B (513), reader thread C (514), reader thread D (515), reader thread E (517), reader thread F (518)) and various writer threads (e.g., writer thread M (512), writer thread N (516), writer thread O (519)). The writer queue (572) may include one writer thread (e.g., writer thread L (511)). As shown in FIG. 5A, reader thread A (510) presently owns the exclusion lock (550) on the program resource (540). As such, reader thread A (510) may retrieve output data X (521) from a data structure stored in the program resource (540).

As shown in FIG. 5B, after reader thread A (510) is done with accessing the program resource (540), writer thread L (511) leaves the writer queue (572) and obtains the exclusion lock (550) and access to the program resource (540). As such, writer thread L (511) may now write input data Y (530) to a data structure inside the program resource (540), and thus update various data values. This example illustrates how the writer thread L (511) may obtain the exclusion lock (550) on the program resource without any further context switches occurring to threads in the thread queue (571).

As shown in FIG. 5C, writer thread M (512) is inserted into the writer queue (572). Furthermore, after writer thread L (511) is done with the program resource (540), various reader threads (i.e., reader thread B (513), reader thread C (514), reader thread D (515)) obtain the exclusion lock (550) and access to the program resource (540). Thus, the reader threads (513, 514, 515) retrieve output data Z (522) from the program resource (540). The thread queue (571) now only includes writer thread N (516), reader thread E (517), reader thread F (518), and writer thread O (519).

Figure 6:
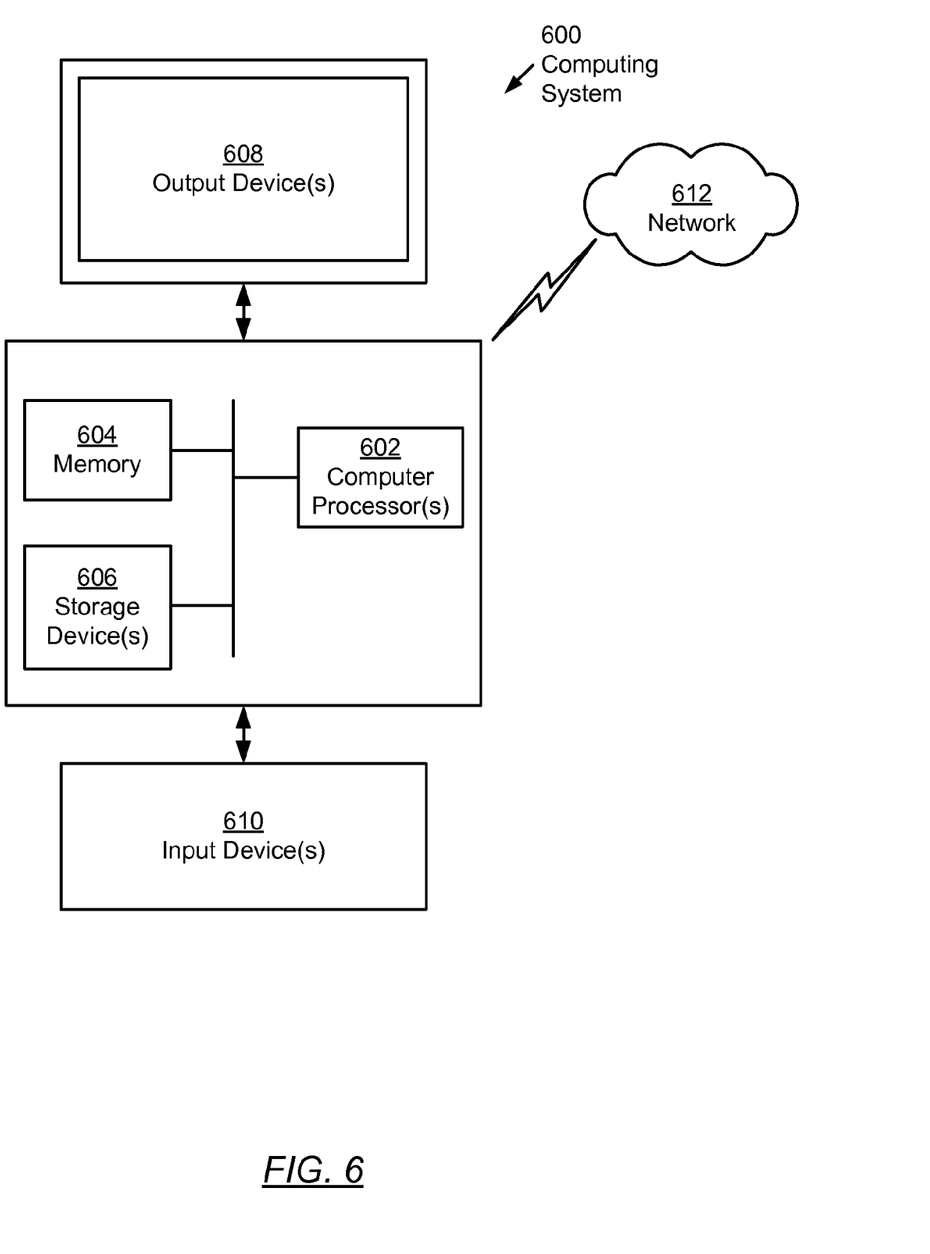
FIG. 6 shows a computing system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (600) may be located at a remote location and connected to the other elements over a network (612). Additionally, embodiments may be implemented on a distributed system having a plurality of nodes, where each portion of the invention may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for scheduling threads for a software application, comprising:
    terminating, to a first writer thread, an exclusion lock on a program resource;
    activating, in response to terminating the exclusion lock to the writer thread, a plurality of reader threads and a second writer thread from suspension in a thread queue, wherein the thread queue comprises a plurality of suspended threads;
    designating the exclusion lock on the program resource to the plurality of reader threads;
    inserting the second writer thread in a writer queue, wherein the second writer thread automatically obtains the exclusion lock in response to a termination of the exclusion lock to the plurality of reader threads; and
    retrieving, by the plurality of reader threads, first data from the program resource.

2. The method of claim 1, further comprising:
    obtaining a suspended thread;
    sorting the plurality of suspended threads within the thread queue according to a plurality of priority scores associated with the plurality of suspended threads,
    wherein the suspended thread is inserted into a location in the thread queue based on a priority score of the suspended thread.

3. The method of claim 1,
    wherein the plurality of reader threads retrieve the first data from the program resource substantially simultaneously.

4. The method of claim 1,
    wherein the plurality of reader threads are located at consecutive positions in the thread queue.

5. The method of claim 1,
    wherein the program resource is a portion of memory configured to be accessed by the software process.

6. A system for scheduling threads for a software application, comprising:
    a processor;
    a memory executable by the processor, the memory comprising functionality for:
        terminating, to a first writer thread, an exclusion lock on a program resource;
        activating, in response to terminating the exclusion lock to the writer thread, a plurality of reader threads and a second writer thread from suspension in a thread queue, wherein the thread queue comprises a plurality of suspended threads;
        designating the exclusion lock on the program resource to the plurality of reader threads;
        inserting the second writer thread in a writer queue, wherein the second writer threads automatically obtains the exclusion lock in response to a termination of the exclusion lock to the plurality of reader threads; and
        retrieving, by the plurality of reader threads, first data from the program resource.

7. The system of claim 6, wherein the memory further comprises functionality for: obtaining a suspended thread; sorting the plurality of suspended threads within the thread queue according to a plurality of priority scores associated with the plurality of suspended threads, wherein the second suspended thread is inserted into a location in the thread queue based on a priority score of the second suspended thread.

8. The system of claim 6,
    wherein the plurality of reader threads retrieve the first data from the program resource substantially simultaneously.

9. A non-transitory computer readable medium storing instructions for scheduling threads for a software application, the instructions comprising functionality for:
    terminating, to a first writer thread, an exclusion lock on a program resource;
    activating, in response to terminating the exclusion lock to the writer thread, a plurality of reader threads and a second writer thread from suspension in a thread queue, wherein the thread queue comprises a plurality of suspended threads;
    designating the exclusion lock on the program resource to the plurality of reader threads;
    inserting the second writer thread in the writer queue, wherein the second writer thread automatically obtains the exclusion lock in response to termination of the exclusion lock to the plurality of reader threads; and
    retrieving, by the plurality of reader threads, first data from the program resource.

10. The non-transitory computer readable medium of claim 6, wherein the instructions further comprise functionality for: obtaining a suspended thread; sorting the plurality of suspended threads within the thread queue according to a plurality of priority scores associated with the plurality of suspended threads, wherein the second suspended thread is inserted into a location in the thread queue based on a priority score of the second suspended thread.

11. The non-transitory computer readable medium of claim 9,
    wherein the plurality of reader threads retrieve the first data from the program resource substantially simultaneously.

* * * * *

UNITED STATES PATENT AND TRADEMARK OFFICE
CERTIFICATE OF CORRECTION

PATENT NO.         : 9,798,585 B2
APPLICATION NO.    : 14/716833
DATED              : October 24, 2017
INVENTOR(S)        : Nanduri It is certified that error appears in the above-identified patent and that said Letters Patent is hereby corrected as shown below:

In the Claims

In Column 10, Line 14, in Claim 7, after "wherein the" delete "second".

In Column 10, Line 16, in Claim 10, delete "the second suspended" and insert -- the suspended --, therefor.

In Column 10, Line 42, in Claim 10, delete "claim 6," and insert -- claim 9, --, therefor.

Signed and Sealed this
Tenth Day of July, 2018

Andrei Iancu
*Director of the United States Patent and Trademark Office*